United States Patent
Samson et al.

(10) Patent No.: US 6,304,711 B1
(45) Date of Patent: Oct. 16, 2001

(54) OPTICAL GLASS, OPTICAL WAVEGUIDE AMPLIFIER AND OPTICAL WAVEGUIDE LASER

(75) Inventors: Bryce Neilson Samson, Southampton; Elizabeth Regala Taylor, Eastbourne; David Neil Payne, Hamble; Mira Naftaly; Animesh Jha, both of Leeds, all of (GB)

(73) Assignees: University of Southampton, Hampshire; Leeds University, Leeds, both of (GB)

( * ) Notice: Subject to any disclaimer, the term of this patent is extended or adjusted under 35 U.S.C. 154(b) by 0 days.

(21) Appl. No.: 09/214,939

(22) PCT Filed: Jul. 17, 1997

(86) PCT No.: PCT/GB97/01920

§ 371 Date: Apr. 12, 1999

§ 102(e) Date: Apr. 12, 1999

(87) PCT Pub. No.: WO98/02388

PCT Pub. Date: Jan. 22, 1998

(30) Foreign Application Priority Data

Jul. 17, 1996 (GB) .................................................. 9615013

(51) Int. Cl.[7] .................................................. G02B 6/00
(52) U.S. Cl. .......................... 385/142; 385/144; 385/123; 372/6
(58) Field of Search ..................................... 385/142, 143, 385/144, 123; 372/6

(56) References Cited

U.S. PATENT DOCUMENTS

| | | | |
|---|---|---|---|
| 4,120,814 | * | 10/1978 | Izumitani ........................... 372/40 |
| 4,142,986 | * | 3/1979 | Rapp ................................... 372/40 |
| 4,358,543 | | 11/1982 | Nozawa . |
| 4,788,687 | | 11/1988 | Miniscalco et al. . |
| 5,338,607 | | 8/1994 | Kawamoto et al. . |

FOREIGN PATENT DOCUMENTS

| | | | |
|---|---|---|---|
| 262 017 A | | 11/1988 | (DE) . |
| 262017A1 | * | 11/1988 | (DE) . |
| 0 320 655 A2 | | 6/1989 | (EP) . |
| 0 320 665 A | | 6/1989 | (EP) . |
| 0 427 320 A | | 5/1991 | (EP) . |
| 0 462 613 A | | 12/1991 | (EP) . |
| 0 462 613 A2 | | 12/1991 | (EP) . |
| 0 535 798 A2 | | 8/1992 | (EP) . |
| 0 535 798 A | | 4/1993 | (EP) . |
| 2 445 820 A | | 8/1980 | (FR) . |
| 2445820A | * | 8/1980 | (FR) . |
| 2 070 583 A | | 9/1981 | (GB) . |

OTHER PUBLICATIONS

Zemon, Excited–state–absorption cross sections and amplifier modeling in the 1300 nm region for Nd–doped glasses, IEEE Photonics Technology Letters, 4(3), pp. 244–247, Mar. 1992.*

(List continued on next page.)

Primary Examiner—Cassandra Spyrou
Assistant Examiner—Leo Boutsikaris
(74) Attorney, Agent, or Firm—Renner, Otto, Boisselle & Sklar LLP

(57) ABSTRACT

Neodymium-doped fluoroaluminate optical glass has a composition: 35 to 45 mol % $AlF_3$; 5 to 30 mol % $RF_2$, where R is selected from the group consisting of Ca, Mg, Sr and Ba; 5 to 25 mol % MF, where M is selected from the group consisting of Na, Li, K and Rb; and 0.001 to 10 mol % dopant.

34 Claims, 10 Drawing Sheets

OTHER PUBLICATIONS

Figure 1:
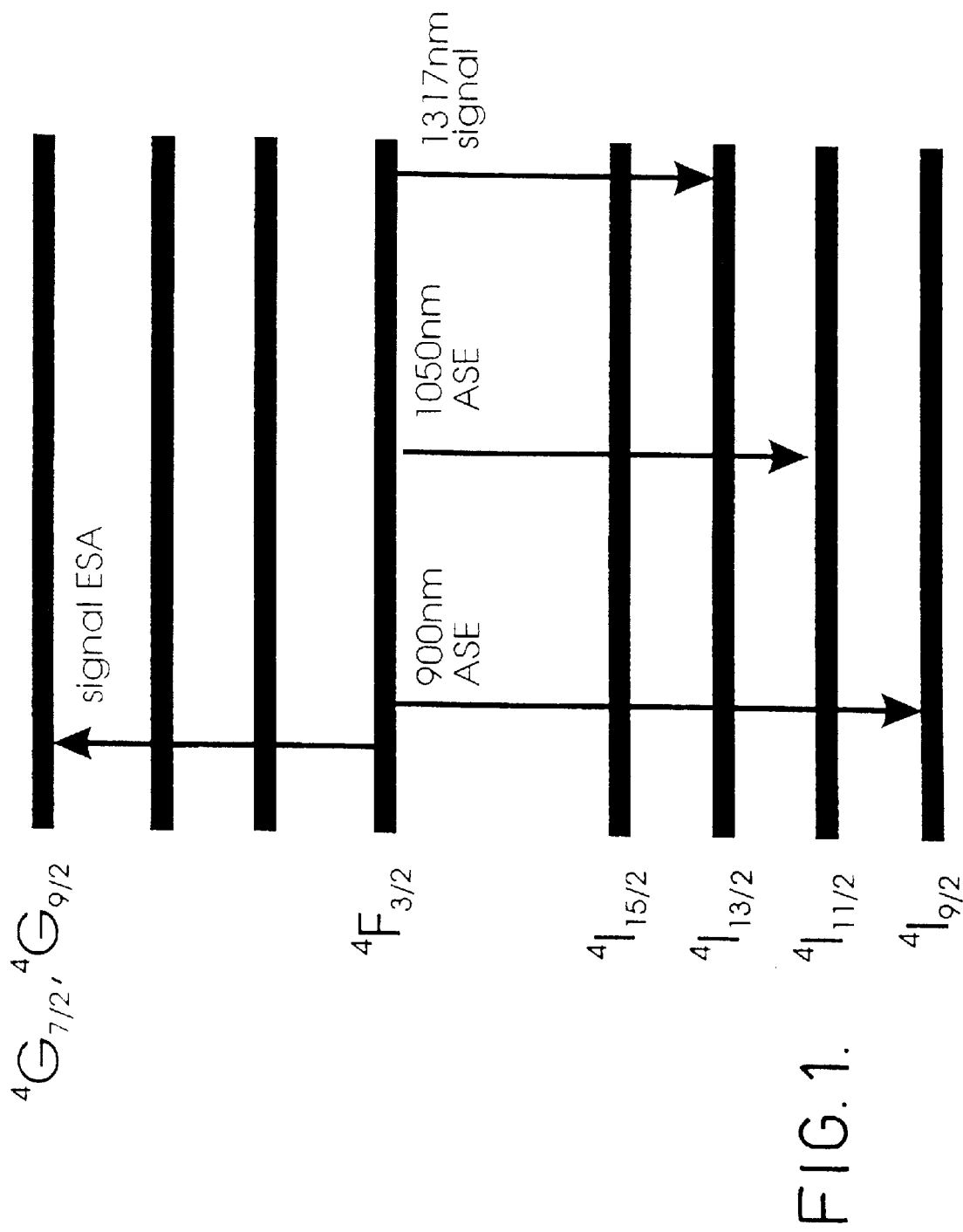

Tesar, Optical properties and laser parameters of Nd3+ doped fluoride glasses, Optical materials 1(1992), pp. 217–234, Sep. 1992.*

Syms and Cozens, "Optical guided waves and devices", McGraw–Hill, pp. 448–449, Jan. 1992.*

Derwent Abstract 87–352570.

Derwent Abstract 81–20461D.

Ishikawa et al., "Laser Emission and Amplification at 1–3 $\mu$m in Neodymium–Doped Fluorophosphate Fibres", Electronic Letters, vol. 28, No. 16, Jul. 30, 1992, pp. 1497–1498.

Zemon et al., "Excited–State–Absorption Cross Sections and Amplifier Modeling in the 1300–nm Region for Nd–Doped Glasses", IEEE Phonotonics Technology Letters, vol. 4, No. 3, Mar. 1992, pp. 244–247.

Tesar A. et al., "Optical Properties and Laser Parameters of ND3+–Doped Fluoride Glasses", Optical Material, vol. 1, No. 3, Sep. 1, 1992, pp. 217–234, XP000307206, see p. 233; tables 1,2.

Soviet Inventions Illustrated, Section Ch, Week 7917, Derwent Publications Ltd., London, GB; Class L01, AN 79–32953B, XP002044662 & SU 610 811 A (Lengd Lensovet Kris), May 12, 1978, see abstract.

Patent Abstracts of Japan, vol. 015, No. 221 (C–0838), Jun. 6, 1991 & JP 03 065522 A (Hoya Corp), Mar. 20, 1991, see abstract.

Patent Abstracts of Japan, vol. 016, No. 238 (C–0946), Jun. 2, 1992 & JP 04 050136 A (Sumitomo Elec Ind Ltd et al), Feb. 19, 1992, see abstract.

Patent Abstracts of Japan, vol. 016, No. 238 (C–0946), Jun. 2, 1992 & JP 04 050137 A (Sumitomo Elec Ind Ltd et al), Feb. 19, 1992, see abstract.

Xuelu Zou et al., "Excitation Energy Transfer of ND3+–Y63+–ER+ In Several Glasses", Journal of the Ceramic Society of Japan, International Edition, vol. 101, No. 1, Jan. 1993, pp. 80–84, XP000378210.

Obro M, "Highly Improved Fibre Amplifier for Operation Around 1300 NM", Electronics Letters, vol. 27, No. 5, Feb. 28, 1991, pp. 470–472, XP000219755, cited in the application.

Sugawa T et al, "10DB Gain and High Saturation Power in a ND3+–Doped Fluorozirconate Fibre Amplifer", Electronics Letters, vol. 26, No. 24, Nov. 22, 1990, pp. 2042–2044, XP000175634, cited in the application.

Database WPI, Section Ch, Week 9325, Derwent Publications Ltd., London, GB; Class L03, AN 93–201250, XP002049230 & JP 05 127 199 A (Nippon Telegraph & Telephone Corp), May 25, 1993, see abstract.

Iqbal et al., "AlF3–Based Glass Fibres with Enchanced Optical Transmission", Electronics Letters, vol. 27, No. 2, Jan. 17, 1991, pp. 110–111, XP000210796 see last paragraph, tables 1,2.

Database WPI, Section Ch, Week 8020, Derwent Publications Ltd., London, GB; Class L01, AN 80–35546C, XP002044661 & JP 55 047 243 A (Hoya Glass Works Ltd), Apr. 3, 1980, see abstract.

* cited by examiner

OPTICAL GLASS, OPTICAL WAVEGUIDE AMPLIFIER AND OPTICAL WAVEGUIDE LASER

This invention relates to optical glasses, optical waveguide amplifiers and optical waveguide lasers.

The possibility of using the $^4F_{3/2}$–$^4I_{13/2}$ transition in rneodymium doped waveguides as an efficient 1.3 μm optical amplifier has been the subject of many studies[1]. However there are two major drawbacks which have hindered its development.

Firstly the presence of signal excited state absorption ("ESA", see FIG. 1) severely compromises the efficiency and operating wavelength of the device.

Secondly, the larger emission cross section for the 1050 nm transition leads to the generation of amplified spontaneous emission (ASE) at this wavelength, which in turn clamps the available gain around 1.3 μm to a relatively low value (about 5–6 dB). Both these phenomena are known in the literature [1,2,3].

The ESA process is very dependent on the glass composition and a number of glass families have been studied in this regard (namely the silicates, fluorozirconates, fluoroberyllates and fluorophosphates)[1,2]. This study concluded that fluoroberyllate glasses were the optimum glass family for 1.3 μm amplifiers because of their very low ESA cross section at this wavelength. However, the toxicity of beryllium rules out this glass family for practical devices. The next best family was concluded to be the fluorophosphate glasses.

It is also known that the use of discrete or continuous 1050 nm ASE filters along the amplifier length allows for a significant increase in the gain at 1.3 μm. Some specific ASE filtering techniques for increasing the 1.3 μm gain in $Nd^{3+}$-doped fibre amplifiers can be found in the literature. These include the use of wavelength division multiplexers (WDMs)[6], mechanical gratings[7], the use of rare earth co-dopants to absorb the 1050 nm ASE[8] and optimisation of the fibre design[9].

This invention provides an optical fibre device formed at least in part of neodymium-doped fluoroaluminate optical glass having a refractive index, at a wavelength of 600 nm, of less than or equal to about 1.444.

This invention also provides an optical fibre amplifier operable at a peak signal wavelength of less than 1320 nm, the amplifier being formed it least in part of neodymium-doped fluoroaluminate optical glass.

Further respective aspects of the invention are defined in the appended claims.

The invention covers a range of fluoroaluminate glass compositions and, in various embodiments, their use as a $Nd^{3+}$-doped optical waveguide amplifier or laser operating around 1.3 μm. Specifically it has been found that at least some of these compositions exhibit negligible ESA at the peak emission wavelength (1317 nm) allowing efficient amplification and lasing to occur at this wavelength.

The family of glass compositions of at least embodiments of the invention have the lowest values of $Nd^{3+}$-1.3 μm ESA cross sections of any glass (with the exception of the fluoroberyllates which are dismissed on the grounds of their toxicity) and as such are considered the optimum glass host for an efficient optical fibre amplifier operating at wavelengths around 1317 nm. This is a shorter peak operating wavelength than that found in either fluorozirconate or fluorophosphate glasses both of which have lasing wavelengths longer than $_{1320}$ nm[4,5]. Indeed only fluoroaluminate glasses operate efficiently at wavelengths less than 1320 nm.

Thus, neodymium doped fluoroaluminate glass waveguides can be used as amplifiers and lasers within the second telecom window between 1300 and 1350 nm. Specifically fluoroaluminate glasses are preferred with compositions (mol %); (35–45)$AlF_3$, (5–30)$RF_2$, (5–25 mol %)MF where R=Mg, Sr, Ba, Ca and M=Na, K, Li, Rb.

Light alkali monovalent fluorides (MF) are an advantageously important component in fluoroaluminate glass compositions intended to obtain a shorter wavelength emission and gain at the 1300 nm transition of $Nd^{3+}$. The inclusion of significant proportions of light MF components, such as LiF and NaF gives rise to a more ionic glass with a lower refractive index. The nephelauxetic effect associated with the low refractive index causes the emission to be blue-shifted to shorter wavelengths. High ionicity reduces the linestrength of 1300 nm ESA and shifts its peak wavelength away from the centre of the emission curve. Together, the blue-shifted emission and the reduced effects of ESA result in gain at shorter wavelengths, below 1320 nm.

This glass system shows a minimum excited state absorption at wavelengths around 1.3 μm when doped with $Nd^{3+}$-ions. As a consequence these glass compositions are the only fluoride glass system (with the exception of the toxic fluoroberyllates) to operate efficiently as a waveguide amplifier or laser at wavelengths below 1320 nm.

The peak gain wavelength in these glasses is 1317 nm which corresponds to the peak emission wavelength thus indicating that negligible ESA occurs at this wavelength.

In order to achieve a high gain 1.3 μm amplifier or laser with these glasses some degree of 1050 nm ASE filtering is required. The filter response should ideally be that of a band blocking filter centred at 1050 nm with around 15 nm bandwidth (full width half maximum).

The neodymium-doped fluoroaluminate fibre amplifier can also offer reduced splicing loss to standard silica fibre, because the glass has a lower refractive index than silica. The refractive index is lower than in ZBLAN and fluorophosphate glasses. As a consequence the amplifier gain is expected to be higher than in other 1.3 μm neodymium-doped fibre amplifiers.

Embodiments of the invention can also provide two new techniques for 1050 nm ASE filtering in $Nd^{3+}$-doped 1.3 μm waveguide amplifiers. The first involves the use of UV induced in-core gratings, which may be written directly into the waveguide core by UV light. This process is made possible by the addition of a photosensitizing agent (eg 1 mol % $CeF_3$ or tin fluoride) to the basic fluoroaluminate core glass composition.

The form of the grating may be either a blazed reflection grating or a long period grating coupling to discrete cladding modes. In either case the grating preferably acts as a band blocking filter, centred at 1050 nm and with a bandwidth of around 15 nm full width half maximum.

The complete amplifier may include many discrete filters or one continuous filter along the total amplifier length. For example, in-core gratings may be written directly into the waveguide core with UV light from, for example, an excimer laser. In order to photosensitise the glass to UV light the core glass is modified from the above compositions to incorporate small amounts (0.01–5 mol %) of cerium fluoride ($CeF_3$) or tin fluoride.

The presence of $Sn^{3+}$ or $Ce^{3+}$-ions greatly increases the photosensitivity of the core glass allowing the formation of periodic refractive index charges or gratings. Careful control of the grating parameters (period, blaze angle and depth of modulation) allows the formation of 1050 nm band-stop gratings with the correct bandwidth. A $Nd^{3+}$-doped waveguide amplifier incorporating one or more of these filters exhibits substantially more gain at wavelengths around 1.3 μm than amplifiers with no filter.

A second method for ASE filtering in other embodiments is based on splicing $Yb^{3+}$-doped fibres at intervals along the length of the $Nd^{3+}$-doped fluoroaluminate fibre. These fibres have around 30 dB absorption at 1050 nm and negligible loss at the $Nd^{3+}$-pump (800 nmn or 740 nm) and signal (1317 nm) wavelengths. The $Yb^{3+}$-doped fibre may be silica, fluoroaluminate or any other fluoride fibre. The advantage in using fluoroaluminate fibre comes from the matching of the fibre refractive indices.

The plural alternate fibre sections act as discrete 1050 nm ASE filters and unlike $Nd^{3+}/Yb^{3+}$ co-doped waveguides do not suffer from energy transfer between the two sets of ions. This greatly increases the device efficiency. (Clearly, by the use of the term "alternate", the skilled man will appreciate that the possibility of other fibres being included between the sections is not excluded).

Both these ASE filtering techniques allow high gain at around 1.3 μm and do not significantly affect the slope efficiency of the device.

The short lengths possible with the $Nd^{3+}$ are significant because both fibre and planar amplifiers and devices are then possible. Planar waveguides offer a number of features. The main advantage of waveguide devices on a chip is time potential for integration of several optical functions on a single substrate. Several aspects of device fabrication are more easily achieved in planar rather than fibre.

Figure 2:
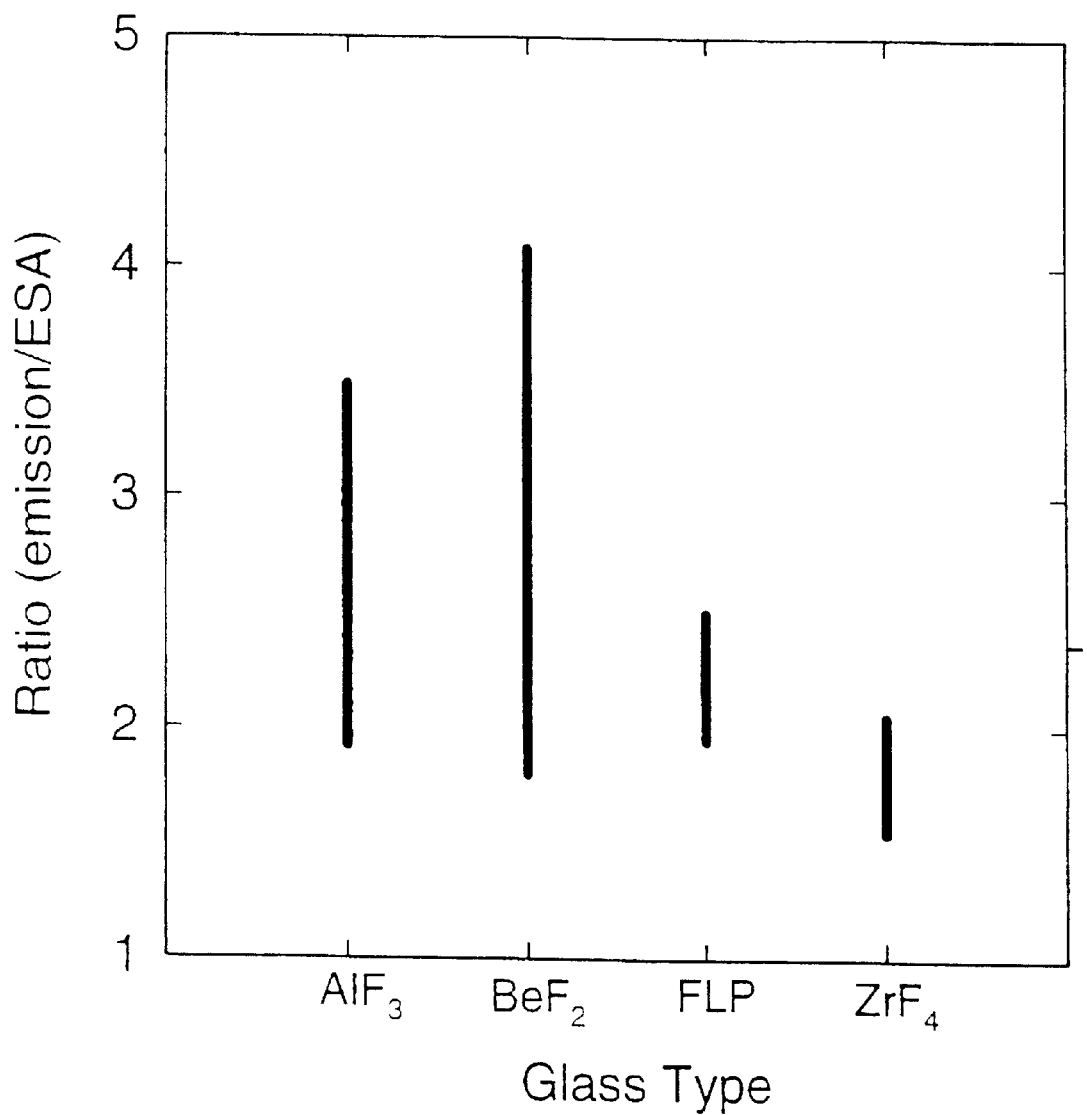
Figure 3:
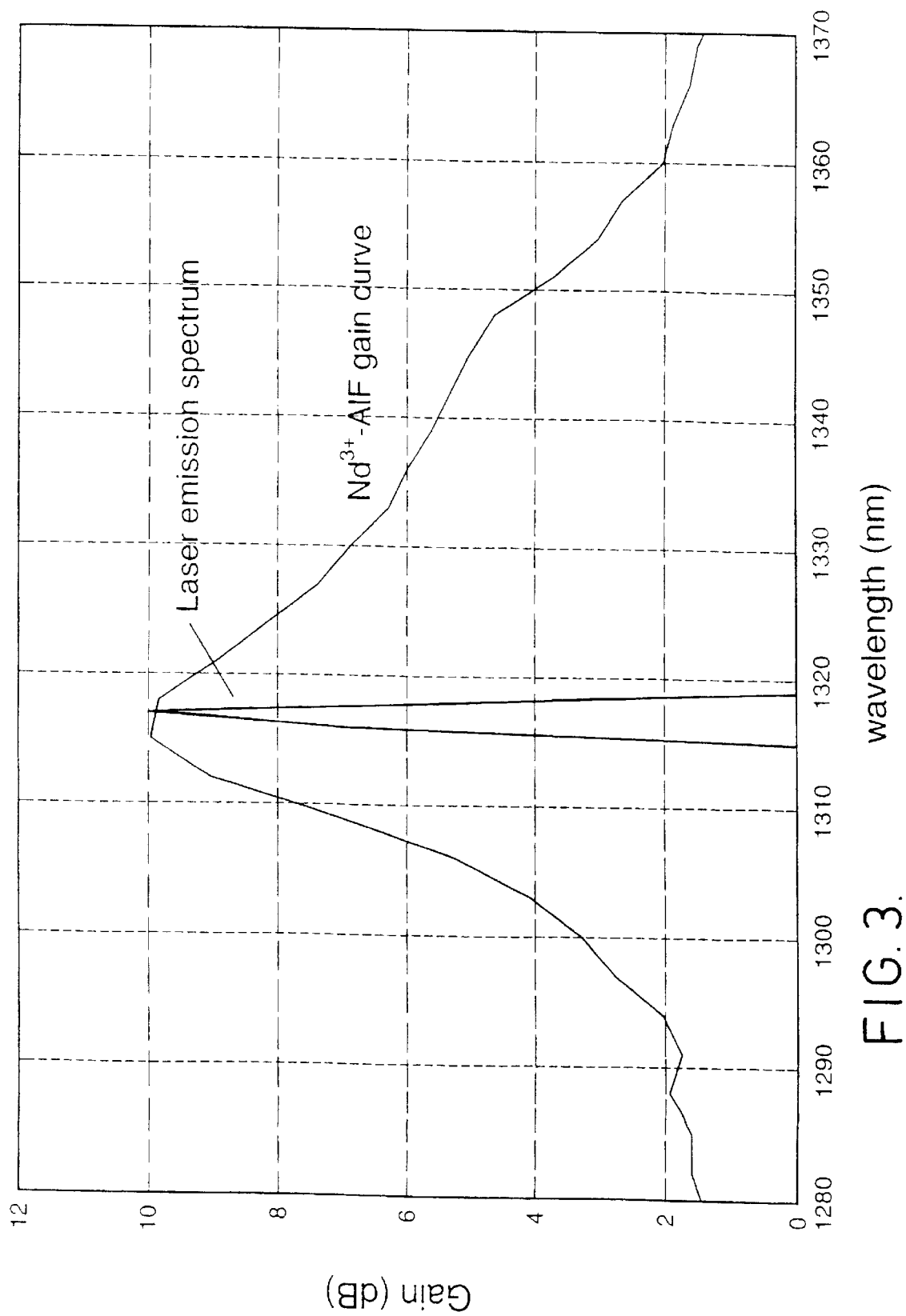
Figure 4:
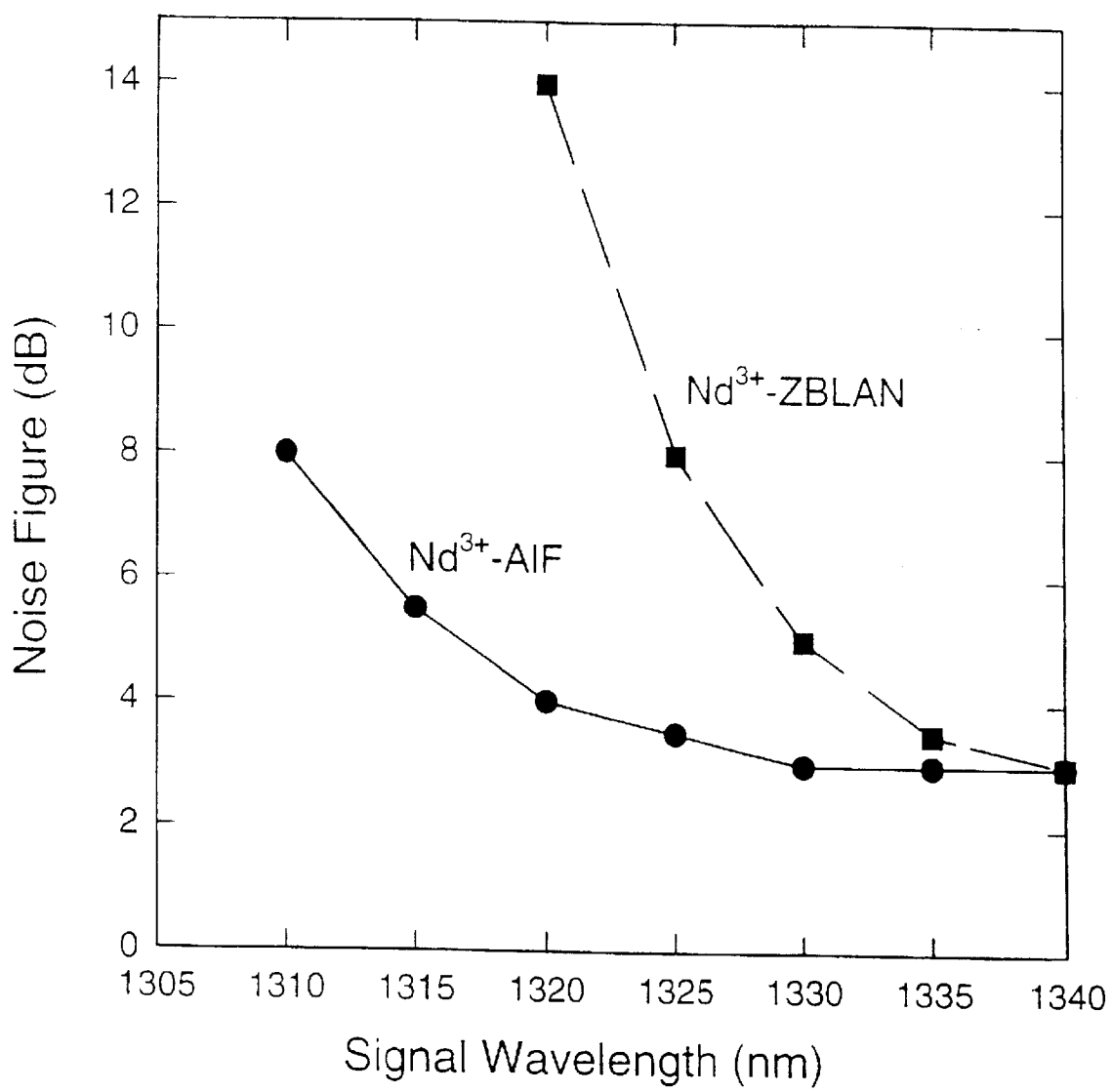
Figure 5:
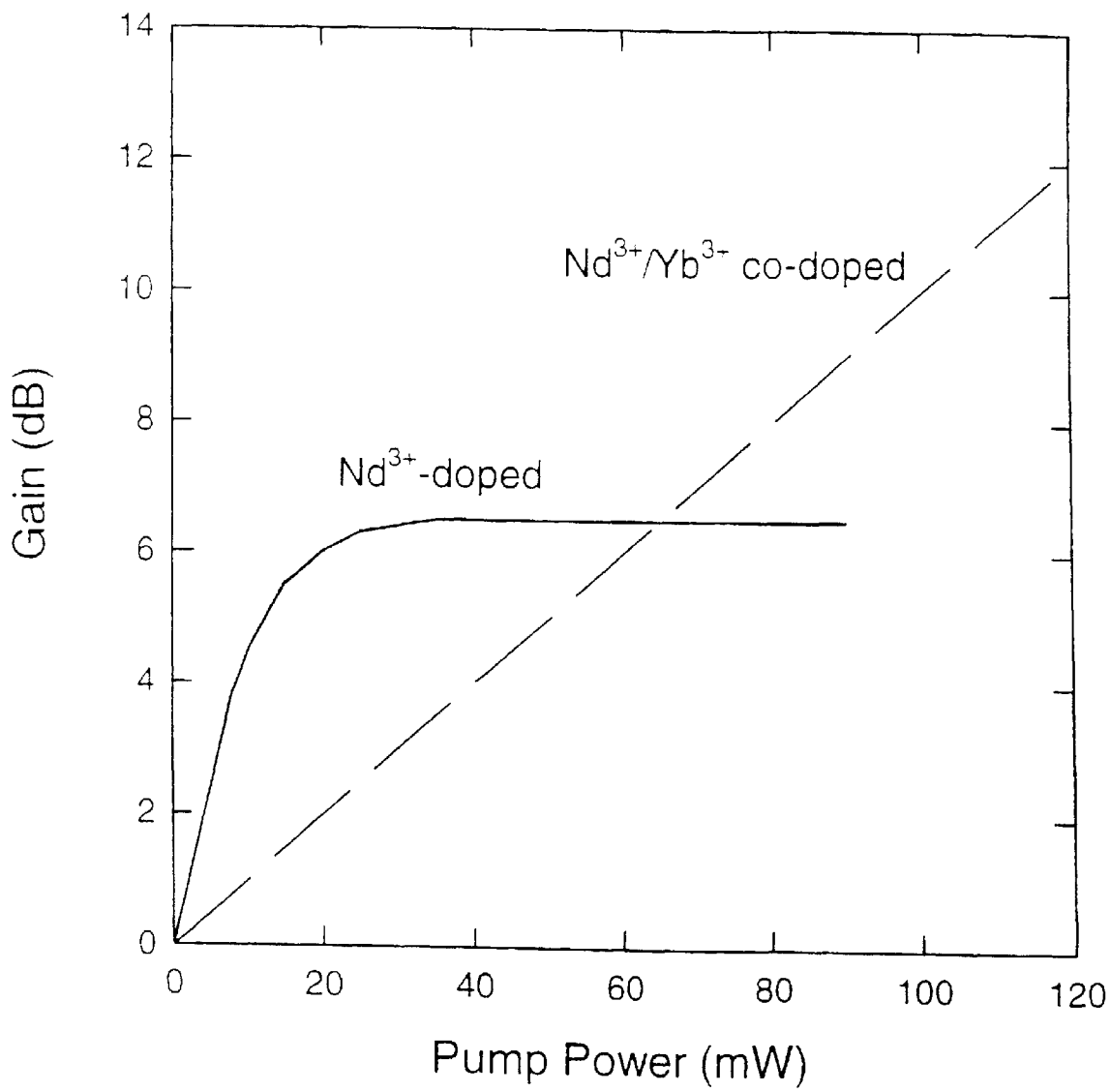
Figure 6:
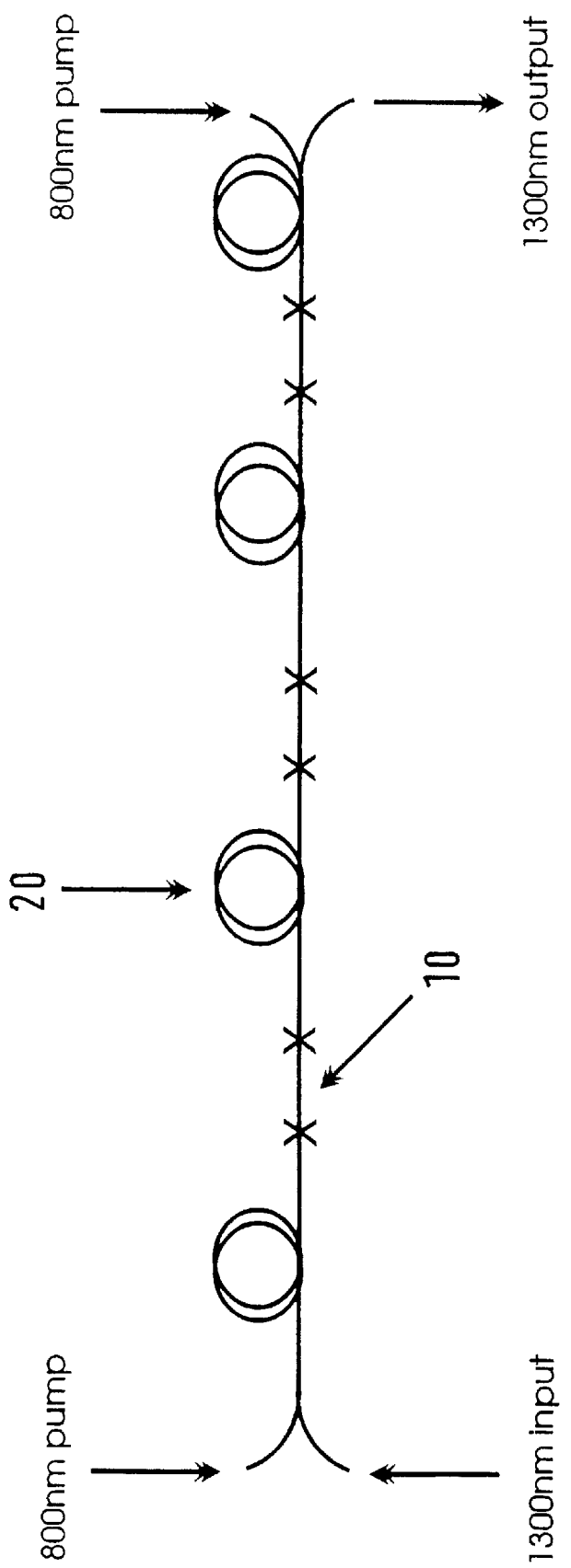
Figure 7:
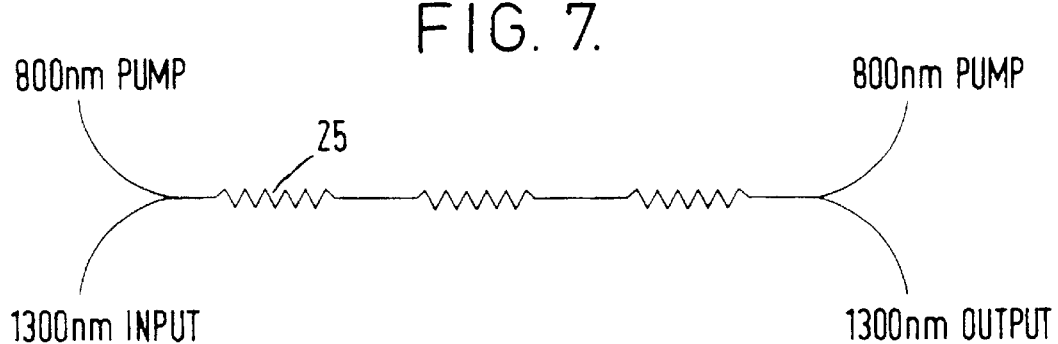
Figure 8:
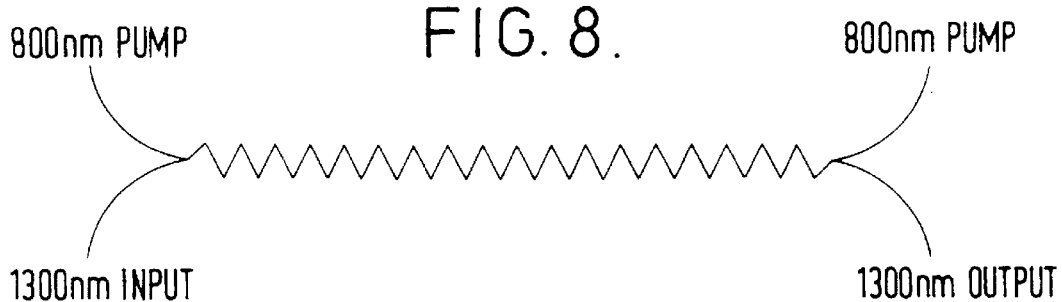
Figure 9:
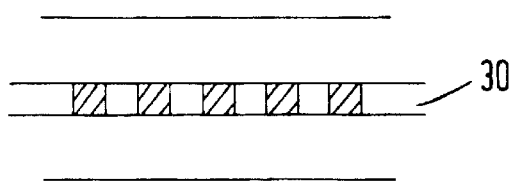
Figure 10:
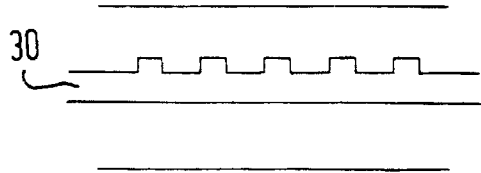
Figure 11:
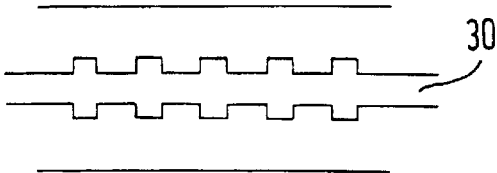
Figure 12:
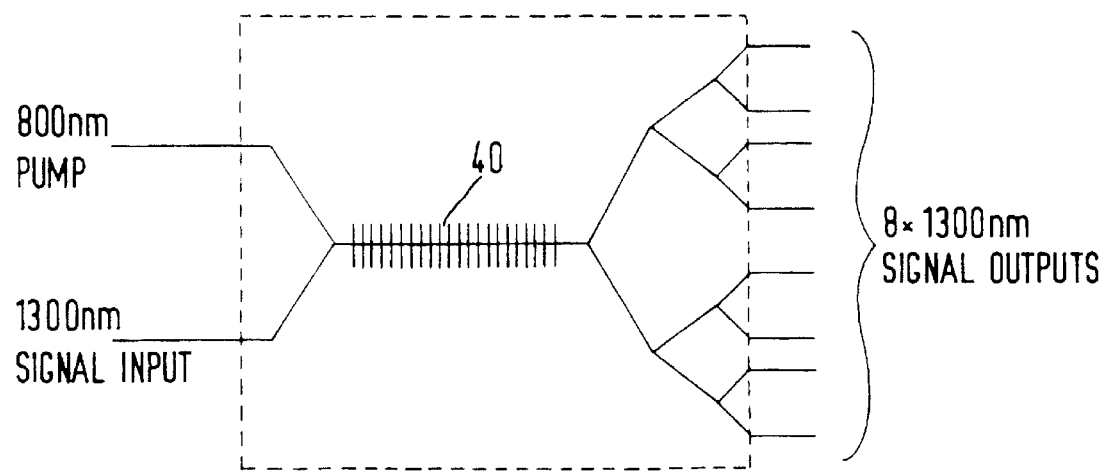
Figure 13:
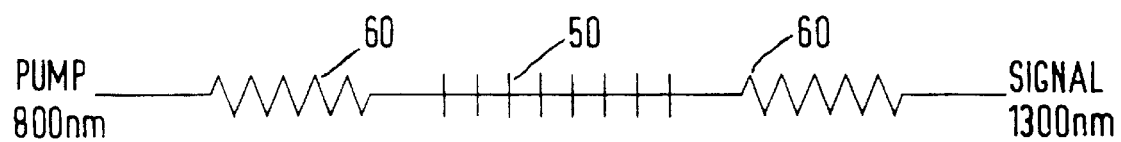
Figure 14:
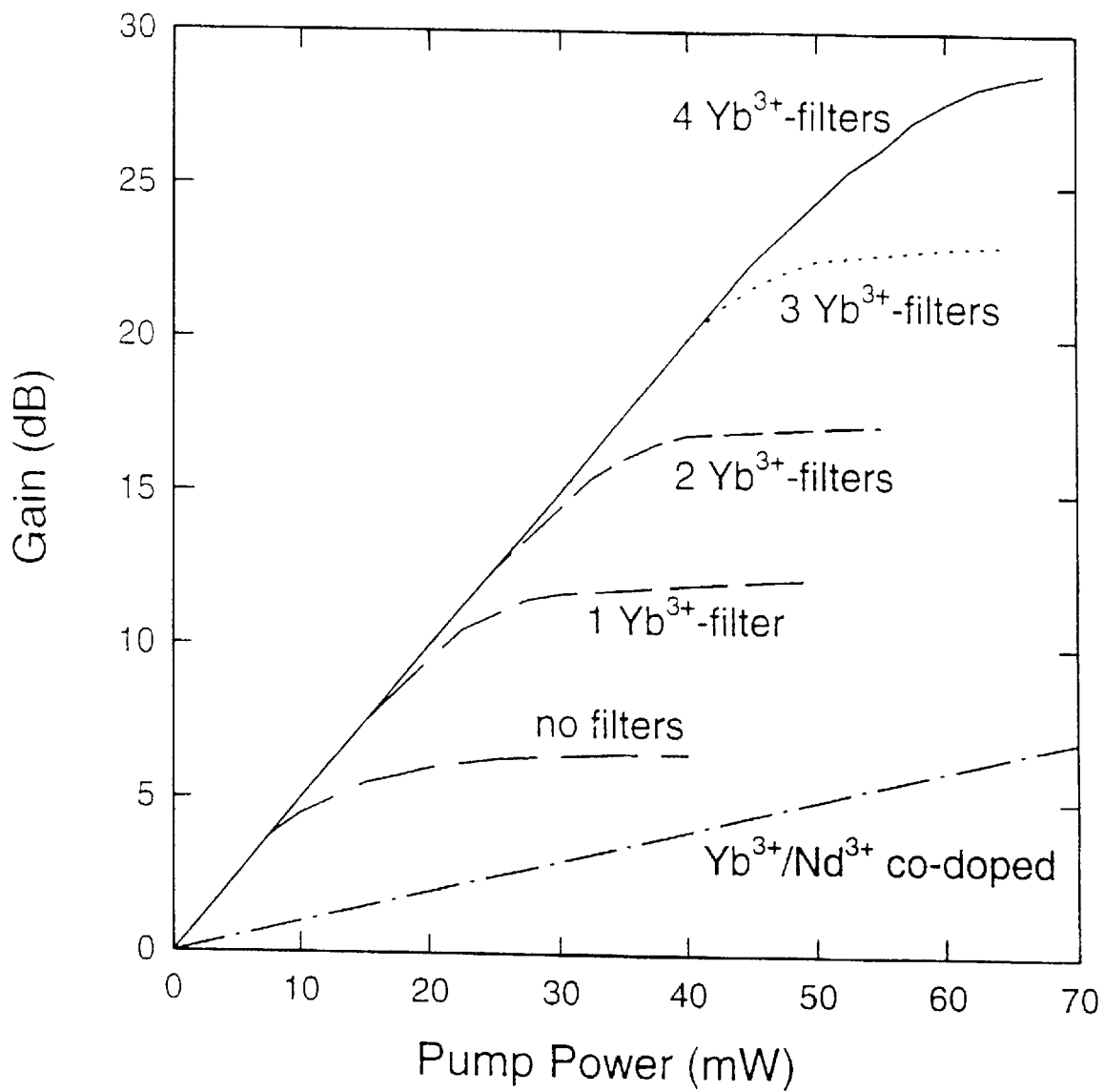
Figure 15:
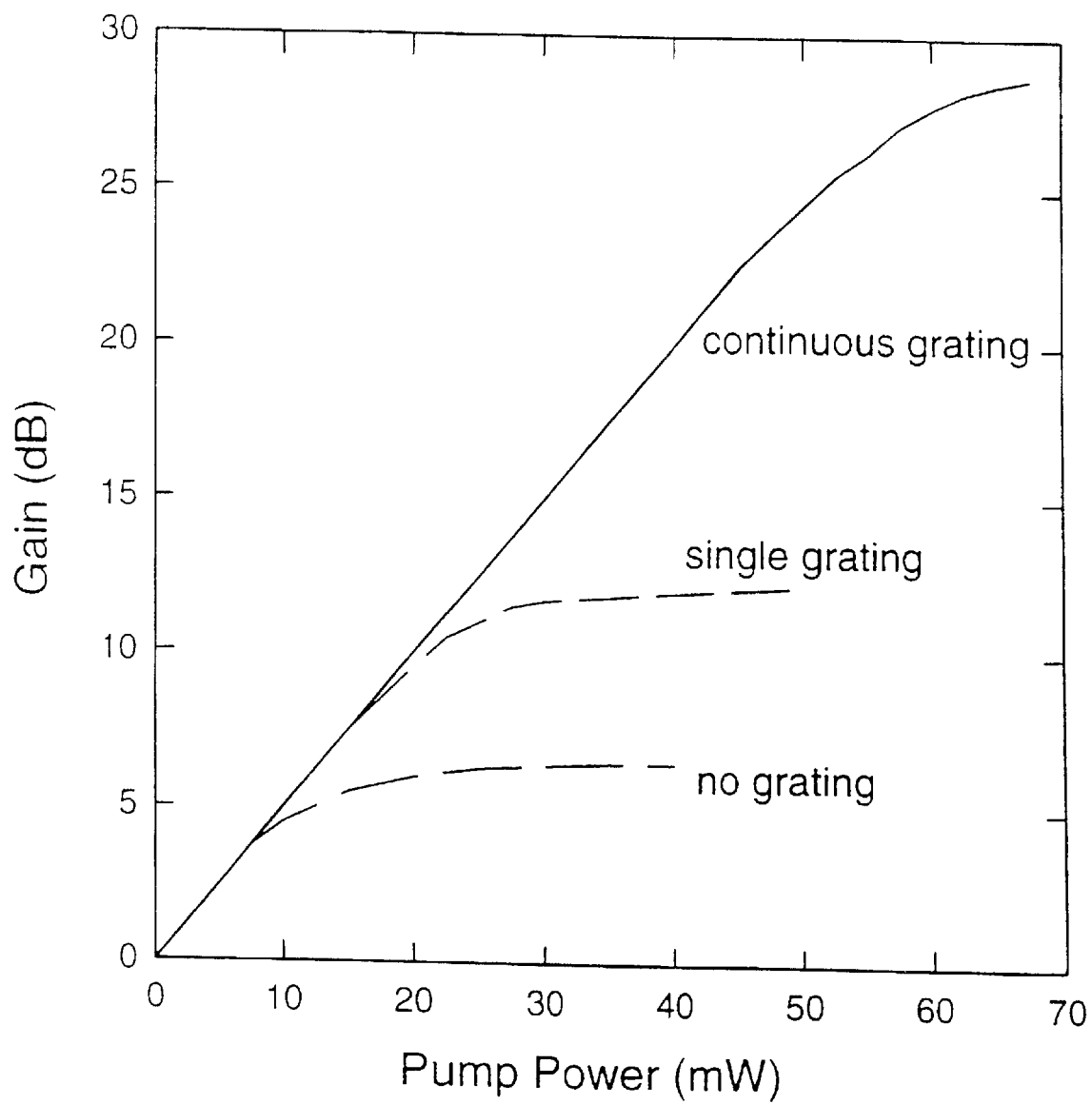

The invention will now be described by way of example with reference to the accompanying drawings, throughout which like parts are referred to by like references, and in which:

FIG. 1 is schematically illustrates an $Nd^{3+}$-energy level diagram;

FIG. 2 schematically illustrates the ratio of the 1.3 μm emission to ESA linestrength in various glasses ($AlF_3$=fluoroaluminate, $BeF_2$=fluoroberyllate, FLP=fluorophosphate, $ZrF_4$=fluorozirconate);

FIG. 3 schematically illustrates the gain curve for $Nd^{3+}$-doped fluoroaluminate glass showing the lasing spectrum for single mode fibre. The gain peak and lasing wavelength are 1317 nm which corresponds to the peak emission wavelength in this glass;

FIG. 4 schematically illustrates the noise figure for $Nd^{3+}$-doped fluorozirconate a fluoroaluminate fibre amplifiers;

FIG. 5 schematically illustrates the small signal gain at 1317 nm for $Nd^{3+}$-doped fluoroaluminate fibre amplifier and $Nd^{3+}/Yb^{3+}$ co-doped amplifier;

FIG. 6 is a schematic diagram of an $Nd^{3+}/Yb^{3+}$ composite amplifier where the $Yb^{3+}$ doped fibre may be silica or fluoroaluminate;

FIG. 7 schematically illustrates an amplifier with discrete ASE-suppressing gratings;

FIG. 8 schematically illustrates an amplifier with a continuous ASE-suppressing grating;

FIGS. 9 to 11 schematically illustrate planar waveguides with continuous ASE-suppressing gratings;

FIG. 12 schematically illustrates a 12-way coupler incorporating an amplifier as described above;

FIG. 13 schematically illustrates a laser incorporating an amplifier as described above;

FIG. 14 schematically illustrates the small signal gain at 1317 nm for $Nd^{3+}/Yb^{3+}$ fluoroaluminate composite amplifier. The gain increases as the number of $Yb^{3+}$-doped fibre sections is increased; and FIG. 15 schematically illustrates the small signal gain for $Nd^{3+}$-doped fluoroaluminate fibre amplifier incorporating a 1050 nm ASE suppressing gratings along the fibre length and a continuous grating along the 10 cm length of the device.

Although a wide range of fluoroaluminate glasses are known and have been described in the literature their potential application in $Nd^{3+}$-doped 1.3 μm optical waveguide amplifiers and lasers has not been considered. The fluoroaluminate glass composition can be optimised or at least improved in terms of minimising the excited state absorption cross section at around 1.3 μm.

A summary of some example $Nd^{3+}$-doped fluoroaluminate glass compositions is shown in tables 1a and 1b, and in table 2 the ratio of the 1.3 μm emission ($^4F_{3/2}$ to $^4I_{13/2}$) to 1.3 μm ESA ($^4F_{3/2}$–$^4G_{7/2}$) linestrengths for each given. Also included for comparison are commercial fluorophosphate glasses (LG810 and PK51A) along with a ZBLAN glass sample. A large value for the emission to ESA ratio is desirable indicating that the probability of stimulated emission is greater than absorption. Note the much improved ratio for the fluoroaluminate glasses, compared with the commercial glasses, indicating a substantial decrease in the 1.3 μm ESA in these glass compositions.

TABLE 1a $NdF_3$-doped (1 mol %) fluoroaluminate glass compositions

| Sample | Composition | Refractive Index |
|---|---|---|
| 59 | $30AlF_3$:$10ZrF_4$:$7.5YF_3$:$3.5MgF_2$:$20CaF_2$:$11BaF_2$:$13SrF_2$:$4NaF$ | 1.441 |
| 62 | $37AlF_3$:$12MgF_2$:$15CaF_2$:$9SrF_2$:$12BaF_2$:$14YF_3$ | 1.426 |
| 91 | $39AlF_3$:$10MgF_2$:$30CaF_2$:$10SrF_2$:$10BaF_2$ | 1.411 |
| 108 | $37AlF_3$:$12MgF_2$:$15CaF_2$:$9SrF_2$:$6BaF_2$:$14YF_3$:$6NaF$ | 1.424 |
| 115 | $39AlF_3$:$9MgF_2$:$30CaF_2$:$9SrF_2$:$9BaF_2$:$3LiF$ | 1.412 |
| 116 | $39AlF_3$:$8MgF_2$:$30CaF_2$:$8SrF_2$:$8BaF_2$:$6LiF$ | 1.410 |
| 117 | $39AlF_3$:$7MgF_2$:$30CaF_2$:$7SrF_2$:$7BaF_2$:$9LiF$ | 1.402 |
| 121 | $39AlF_3$:$6MgF_2$:$30CaF_2$:$6SrF_2$:$6BaF_2$:$6LiF$:$6NaF$ | 1.398 |
| 122 | $39AlF_3$:$6MgF_2$:$26CaF_2$:$6SrF_2$:$6BaF_2$:$8LiF$:$8NaF$ | 1.401 |
| 123 | $39AlF_3$:$6MgF_2$:$22CaF_2$:$6SrF_2$:$6BaF_2$:$10LiF$:$10NaF$ | 1.397 |
| 124 | $39AlF_3$:$6MgF_2$:$18CaF_2$:$6SrF_2$:$6BaF_2$:$12LiF$:$12NaF$ | 1.394 |

TABLE 1b $NdF_3$-doped (1 mol %) fluoroaluminate glass compositions

| Sample | Composition | Refractive Index |
|---|---|---|
| 129 | $40AlF_3$:$6MgF_2$:$14CaF_2$:$6BaF_2$:$6SrF_2$:$14NaF$:$14LiF$ | 1.385 |
| 130 | $40AlF_3$:$6MgF_2$:$12CaF_2$:$6SrF_2$:$6BaF_2$:$15LiF$:$15NaF$ | 1.383 |
| 131 | $40AlF_3$:$6MgF_2$:$10CaF_2$:$6SrF_2$:$6BaF_2$:$16LiF$:$16NaF$ | 1.382 |
| 136 | $40AlF_3$:$5MgF_2$:$22CaF_2$:$5SrF_2$:$4BaF_2$:$10LiF$:$10NaF$:$3NaPO_3$ | 1.383 |
| 152 | $38AlF_3$:$9MgF_2$:$29CaF_2$:$9BaF_2$:$15NaF$ | 1.389 |

In other words, this table shows glasses having a general composition:

35 to 42 mol % $AlF_3$;

0 to 10 mol % $MgF_2$;

0 to 30 mol % $CaF_2$;

0 to 10 mol % $SrF_2$;

0 to 10 mol % $BaF_2$;
0 to 30 mol % LiF;
0 to 30 mol % NaF;
(having a total LiF+NaF content of 10 to 40 mol %); and 0.001 to 10 mol % $NdF_3$ dopant.

TABLE 2

Summary of Judd-Ofelt paramteres for $Nd^{3+}$-doped fluoroaluminate glasses.

| Sample | Ref. Index | $\lambda_p$ (nm) | $\Omega_2$ ($\times 10^{-24}$) | $\Omega_4$ ($\times 10^{-24}$) | $\Omega_6$ ($\times 10^{-24}$) | emission/ ESA |
|---|---|---|---|---|---|---|
| 59 | 1.441 | 1317.5 | 1.24 | 3.40 | 4.40 | 2.54 |
| 62 | 1.426 | 1317 | 1.37 | 3.15 | 4.47 | 2.66 |
| 91 | 1.411 | 1317.5 | 1.42 | 3.35 | 5.09 | 2.82 |
| 108 | 1.424 | 1317 | 1.08 | 3.33 | 4.32 | 2.67 |
| 115 | 1.412 | 1317 | 0.75 | 3.08 | 4.13 | 3.03 |
| 116 | 1.140 | 1317 | 0.88 | 3.05 | 4.37 | 3.06 |
| 117 | 1.402 | 1317 | 1.00 | 4.01 | 5.36 | 2.97 |
| 121 | 1.398 | 1317 | 1.38 | 3.97 | 6.05 | 3.04 |
| 122 | 1.401 | 1317 | 1.07 | 4.34 | 5.79 | 3.06 |
| 123 | 1.397 | 1317 | 1.15 | 3.39 | 5.83 | 3.48 |
| 124 | 1.394 | 1317 | 1.35 | 3.97 | 6.37 | 3.24 |
| FK54 | 1.437 | 1320.5 | 1.79 | 3.50 | 4.41 | 2.15 |
| LG810 | 1.453 | 1320 | 2.65 | 3.22 | 5.06 | 2.08 |
| ZBLAN | 1.54 | 1317 | 2.20 | 2.83 | 3.94 | 2.01 |

A summary of these results is shown in FIG. 2 where we plot the ratio of the 1.3 µm emission to 1.3 µm ESA for a range of glass families. The best glasses, with the exception of the fluoroberyllates, are a family of fluoroaluminate glasses having a significantly reduced ESA linestrength compared to both ZBLAN and fluorophosphate glasses. The data for fluorophosphate, fluorozirconate and fluoroberyllate glasses can be found in reference 10 which includes a detail spectroscopic study of Nd-doped glasses. However reference 10 does not include $Nd^{3+}$-doped fluoroaluminate glasses.

These fluoroaluminate glasses have a large proportion of $AlF_3$ as glass former and include in the composition large amounts of light alkali fluorides such as LiF and NaF. The light alkali fluorides combine some of the smallest ionic radii with very large electropositivities. Their presence in the glass increases the ionicity of the host and creates sites with low local basicity, leading to decreased ESA. This approach enabled us to improve the $Nd^{3+}$ gain curve in accordance with the requirements of a 1.3 µm amplifier device. Another significant physical property of these optimised fluoroaluminate glass compositions is their very low values of refractive index (see table 1). Optimised compositions have refractive index values less than 1.43 (measured at a wavelength around 600 nm) as a result of the large amounts of light alkali fluorides present in the glass.

The fluoroaluminate glass compositions may be stabilized by the addition of divalent fluorides as modifier ions. These also resulted in the creation of well-dispersed sites, thus delaying the onset of cross-relaxation to doping levels of >0.5 mol %. The lighter divalent fluorides (i.e. $CaF_2$ and $MgF_2$) were predominantly included in order to maintain the prevalent ionicity of the glass host and to preserve its low refractive index.

An enhancement of the glass stability may be obtained by adding a small amounts of phosphate ($PO_3$), which can improve the fibre drawing properties of the glasses. However, the inclusion of phosphate within the glass has a detrimental effect on the spectroscopic quality of the glasses. The addition of phosphate increases the ESA linestrength and shifts the emission peak wavelength to longer wavelength (see tables 3 and 4). These detrimental effects are not too severe when small amounts of phosphate (<10 mol %) are used.

TABLE 3

$NdF_3$-doped (1 mol %) fluoroalumino-phosphate glass compositions

| Sample | Composition | Refractive Index |
|---|---|---|
| 62 | $37AlF_3$:$12MgF_2$:$15CaF_2$:$9SrF_2$:$12BaF_2$:$14YF_3$ | 1.426 |
| 69 | $37AlF_3$:$12MgF_2$:$15CaF_2$:$9SrF_2$:$8BaF_2$:$14YF_3$:$4NaPO_3$ | 1.427 |
| 70 | $37AlF_3$:$12MgF_2$:$15CaF_2$:$9SrF_2$:$6BaF_2$:$14YF_3$:$6NaPO_3$ | 1.432 |
| 71 | $37AlF_3$:$12MgF_2$:$15CaF_2$:$9SrF_2$:$4BaF_2$:$14YF_3$:$8NaPO_3$ | 1.431 |
| 72 | $37AlF_3$:$12MgF_2$:$15CaF_2$:$9SrF_2$:$14YF_3$:$12NaPO_3$ | 1.439 |
| 73 | $37AlF_3$:$12MgF_2$:$15CaF_2$:$14YF_3$:$21NaPO_3$ | 1.444 |

In general, at least some preferred embodiments of the invention may have the composition: 35 to 45 mol % $AlF_3$; 5 to 30 mol % $RF_2$, where R is selected from the group consisting of Ca, Mg, Sr and Ba; 5 to 25 mol % MF, where M is selected from the group consisting of Na, Li, K and Rb; and 0.001 to 10 mol % $NdF_3$ dopant.

TABLE 4

Summary of Judd-Ofelt parameters for $Nd^{3+}$-doped fluoroalumino-phosphate glasses.

| Sample | Ref. Index | $\tau_{meas}$ (µs) | $\tau_{rad}$ (µs) | $\lambda_p$ (nm) | $\Omega_2$ ($\times 10^{-24}$) | $\Omega_4$ ($\times 10^{-24}$) | $\Omega_6$ ($\times 10^{-24}$) | $A_{emm}/A_{esa}$ |
|---|---|---|---|---|---|---|---|---|
| 62 | 1.426 | 495 | 556 | 1317 | 1.37 | 3.15 | 4.47 | 2.66 |
| 69 | 1.427 | 489 | 568 | 1317.5 | 1.58 | 3.06 | 4.46 | 2.47 |
| 70 | 1.432 | 500 | 602 | 1318 | 1.44 | 2.95 | 4.06 | 2.40 |
| 71 | 1.431 | 469 | 533 | 1319 | 1.73 | 3.49 | 4.54 | 2.25 |
| 72 | 1.439 | 488 | 465 | 1319 | 2.43 | 3.74 | 5.28 | 2.14 |
| 73 | 1.444 | 468 | 468 | 1320 | 2.74 | 3.74 | 5.15 | 1.96 |

Since these fluroaluminate glasses have such low refractive index values it is difficult to fabricate high NA fibres without seriously compromising the spectroscopic parameters. For this application the addition of small amounts (e.g. up 5 mol %) of lead, cadmium or bismuth fluoride to the core glass composition is preferred to the addition of phosphate.

The fluoroaluminate glasses were prepared from commercial high purity fluoride powders. The batch was processed throughout under the atmosphere of dry nitrogen. Prior to melting, the prepared batch was fluorinated for a period depending on the amount of impurities present, with the aim of reducing residual impurity levels. This was done using $NH_4.HF_2$ at 500° C. for a period the duration of which depends on the amount of impurities (typically 2–4 hr). The glass was melted and homogenized for 4 hr at 900–950° C., depending on the composition. The glass was then cast into a mould preheated to 250–350° C., depending on the composition and the mould. The glass was annealed at near its transition temperature for a period of 12–24 hr. It was found that the quality of the glass was greatly improved by re-melting it rapidly for 20 min and re-casting it. The amount of bubbles in the glass was greatly reduced by this procedure, and homogeneity and surface quality were considerably enhanced.

Preforms were manufactured using the following procedure. Rotational casting was used to produce cladding glass tubes with an internal diameter of 2–4 mm. Core glass rods were cast in a stationary cylindrical mould and caned to match the cladding glass tube. Preformns were then produced by inserting the caned core into the cladding tube, using the rod-in-tube method. Single mode fibres were obtained by repeating the tube-in-rod process as required to achieve the desired core-to-cladding ratio.

The measured gain curve for a $Nd^{3+}$-doped fluoroaluminate glass fibre amplifier is shown in FIG. 3. The peak of the gain curve (1317 nm) also corresponds to the peak of the emission curve indicating the negligible ESA at this wavelength. Also shown in this Figure is the laser emission spectrum which for this fibre occurs at 1317 nm (ie the peak of the emission curve). This was measured by butting two high reflecting mirrors (reflectivity >80% at wavelengths between 1400 nm and 1200 nm and less than 10% between 1100 nm and 900 nm) to both of the fibre ends. Pump light at 800 nm was launched through one of these mirrors. This lasing wavelength is significantly shorter than that achieved in neither fluorophosphate or fluorozirconate fibres which both lase at wavelengths longer than 1320 nm[4,5]. This is summarised in table 5. The laser configurations (except as described herein) are conventional.

TABLE 5

Comparison of $Nd^{3+}$-doped glass laser wavelengths

| Glass | Peak Emission wavelength | Lasing Wavelength |
|---|---|---|
| Fluoroaluminate | 1317 nm | 1317 nm |
| fluorozirconate | 1317 nm | 1330 nm |
| Fluorophosphate | 1320 nm | 1323 nm |

The shorter peak gain wavelength is desirable for applications in telecommunications where the zero dispersion wavelength is around 1310–1317 nm in most of the currently installed fibre links. Furthermore, the reduced ESA in the fluoroaluminate device gives a much lower noise figure when operated as a small signal amplifier at wavelengths less than 1340 nm when compared with a ZBLAN device (FIG. 4). Consequently a $Nd^{3+}$-doped fluoroaluminate amplifier is more desirable in telecommunications applications than a $Nd^{3+}$-doped ZBLAN device. Such applications are as small signal amplifiers or power amplifiers operating around 1317 nm.

The small signal gain at 1317 nm versus pump power for a $Nd^{3+}$-doped fluoroaluminate fibre amplifier is shown in FIG. 5 where the gain is seen to saturate at about 6 dB due to the effect of the 1050 nm ASE. Also shown is the curve obtained for a $Nd^{3+}/Yb^{3+}$ co-doped fibre amplifier. Although the gain is no longer clamped in the co-doped case the slope efficiency is much decreased with respect to the $Nd^{3+}$-doped device. This is due to energy transfer from the $Nd^{3+}$ ions to the $Yb^{3+}$ ions causing a significant decrease in the device efficiency.

In order to obtain a high gain at 1317 nm without compromising the device efficiency the $Yb^{3+}$ can be incorporated within separate sections of fibre which are then spliced into the $Nd^{3+}$-doped fluoroaluminate fibre (see., FIG. 6). The $Yb^{3+}$-doped fibre section need not be fluoroaluminate glass but can be silica or any other glass composition. The advantage in using fluoroaluminate fibre sections is the good match in refractive index between the $Nd^{3+}$ and $Yb^{3+}$-fibre sections. Using $Yb^{3+}$-doped silica sections is better when angle splices are used to reduced back reflections due to the refractive index mismatch.

The $Yb^{3+}$-doped sections 20 inhibit ASE at 1050 nm by absorbing at that wavelength. Typically, each section of $Nd^{3+}$ doped AlF fibre might be 2 cm long, and each $Yb^{3+}$-doped section might be 10–20 m long. Fibre splices are indicated schematically by "X" symbols.

FIG. 14 shows the gain at 1317 nm for a fluoroaluminate fibre with the gain clamped at about 6 dB. The gain curves obtained by splicing sections of $Yb^{3+}$-doped fluoroaluminate fibre are also shown in this Figure. The Grain increases as the number of $Yb^{3+}$-doped fibres is increased and the device efficiency is not compromised. Clearly this is not the case for the $Nd^{3+}/Yb^{3+}$ co-dope device.

The fluoroaluminate core glass composition can be modified to include 1 mol % $CeF_3$ or tin fluoride thus increasing the ultra violet (UV) absorption at about 248 nm. By exposing the fibre to intense UV radiation from an excimer laser a permanent change in the glass refractive index could be formed. Refractive index changes of the order of about $1 \times 10^{-3}$ can be produced by this means. By illuminating the fibre core with spatially modulated light from a phase mask or interferometer a periodic modulation of the fibre core refractive index can be achieved. Such a structure can act as a diffraction grating for light travelling along the fibre core. By careful control of the grating parameters (blaze angle, period and refractive index change) the grating can act as a band blocking filter for 1050 nm light.

FIG. 7 illustrates an alternative arrangement in which discrete ASE-suppressing gratings 25 are written or spliced into the $Nd^{3+}$-coped AlF fibre. For example, these could be long-period gratings which tend to Divert light at 1050 nm into cladding modes. FIG. 8 shows a similar arrangement in which a continuous grating is written.

By writing one or more of these gratings midway along the fluoroaluminate fibre we achieve a doubling of the available gain at 1317 nm due to the suppression of the 1050 nm ASE (shown in FIG. 15). Also shown is the gain curve for a device incorporating a 10 cm long grating written the continuous length of a fluoroaluminate fibre amplifier.

UV written, grating based ASE filters may also be written in silica fibre and subsequently spliced to the $Nd^{3+}$-doped fluoroaluminate fibre. However this suffer the disadvantage of needing an angle splice to suppress reflections due to the refractive index mismatch.

FIGS. 9 to 11 illustrate similar techniques for use with planar waveguides. In particular, FIG. 9 illustrates the formation of a suitable grating over an $Nd^{3+}$-doped light guiding core 30 by an overclad substrate. FIGS. 10 and 11 schematically illustrate the periodic etching of a light-guiding substrate 30.

FIG. 12 schematically illustrates one potential use of these devices, in a 1×8 splitter—e.g. for the final link in a home distribution system by optical fibre. Here, an amplifier as described above having an imposed ASE-suppressing grating 40.

FIG. 13 schematically illustrates a fibre laser employing an amplifier as described above with an ASE-suppressing

PUBLICATION REFERENCES

1. S. Zemon et al, 'Excited State-Absorption Cross Sections and Amplifier Modelling in the 1300 nm Region for Nd-Doped Glasses', Photon. Technol. Lett., 4, pp244–247, (1992).
2. W. J. Miniscalco, in 'Rare Earth Doped Fibre Lasers and Amplifiers', Chapter 2, pp19–133, Ed. M. J. F. Digonnet (Marcel Dekker, Inc), (1993).
3. J. Obro et al, "Highly improved fibre amplifier for operation around 1300 nm", Electronics Letters, 27, pp470–472, (1991).
4. EP-A-0320665.
5. E. Ishikawa, H. Aoki, T. Yamashita and Y. Asahara, 'Laser Emission and Amplification at 1.3 μm in Neodymium-Doped Fluorophosphate Fibres', Electron. Lett. 28, 1492, (1992).
6. T. Sugawa et al, "10 dB gain and high saturation power in a $Nd^{3+}$-doped fluorozirconate fibre amplifier", Electronics Letters, 26, pp2042–2044, (1990).
7. J. Obro et al, "gain enhancement in $Nd^{3+}$ doped ZBLAN fibre amplifier using mode coupling filter", Electronics Letters, 28, pp99–101, (1992).
8. EP-A-0462613
9. A. Bjarklev et al 37 9 dB Gain improvement of 130 nm optical amplifier by amplified spontaneous emission suppression fibre design", Electronics Letters, 19, pp1701–1702, (1991).
10. S. E. Stokowski et al, "$Nd^{3+}$-doped laser glass spectroscopic and physical properties", Lawrence Livermore National Laboratory Report, M-95, Rev.2, Vol.1, 2, 1981.

What is claimed is:

1. An optical waveguide device formed at least in part of neodymium-doped fluoroaluminate optical glass having a refractive index, at a wavelength of 600 nm, of less than or equal to about 1.444, in which the optical glass has a composition comprising:

35 to 45 mol % $AlF_3$;

5 to 30 mol % $RF_2$, where R is selected from the group consisting of Ca, Mg, Sr and Ba;

5 to 25 mol % MF, where M is selected from the group consisting of Na, Li, K and Rb; and 0.001 to 10 mol % $NdF_3$; and wherein the device has a 1.3 μm neodynium emission wavelength, from a $^4F_{3/2}$ to $^4I_{13/2}$ transition, as well as a 1.3 μm excited state absorption, from a $^4F_{3/2}$ to $^4G_{7/2}$ transition, and wherein the optical glass has said composition providing a line strength ratio of the 1.3 μm neodynium emission to the 1.3 μm excited state absorption sufficiently large to provide gain at wavelengths less than 1320 nm within the second telecom window between 1300 and 1350 nm.

2. An optical waveguide device according to claim 1, the optical glass having a refractive index, at a wavelength of 600 nm, less than or equal to 1.389.

3. An optical waveguide device according to claim 1, the device being an optical amplifier operable at a peak signal wavelength of less than 1320 nm, the optical amplifier being formed at least in part of the neodymium-doped fluoroaluminate optical glass.

4. An optical waveguide device according to claim 3, wherein the optical amplifier is part of a laser.

5. An optical waveguide device formed at least in part of neodymium-doped fluoroaluminate optical glass having a refractive index, at a wavelength of 600 nm, of less than or equal to about 1.444, in which the optical glass has a composition comprising:

35 to 42 mol % $AlF_3$;

0 to 10 mol % $MgF_2$;

0 to 30 mol % $CaF_2$;

0 to 10 mol % $SrF_2$;

0 to 10 mol % $BaF_2$;

having a total $MgF_2+CaF_2+SrF_2+BaF_2$ content to 20 to 60 mol %;

0 to 30 mol % LiF;

to 30 mol % NaF;

having a total LiF+NaF content of 10 to 40 mol %; and 0.001 to 10 mol % $NdF_3$; and wherein the device has a 1.3 μm neodynium emission wavelength, from a $^4F_{3/2}$ to $^4I_{13/2}$ transition, as well as a 1.3 μm excited state absorption, from a $^4F_{3/2}$ to $^4G_{7/2}$ transition, and wherein the optical glass has said composition providing a line strength ratio of the 1.3 μm neodynium emission to the 1.3 μm excited state absorption sufficiently large to provide gain at wavelengths less than 1320 nm within the second telecom window between 1300 and 1350 nm.

6. An optical waveguide device according to claim 1, the optical glass comprising between 1 mol % and 10 mol % $PO_3$.

7. An optical waveguide device according to claim 1, the optical glass comprising one or more constituents selected from the group consisting of:

0 to 5 mol % $PbF_2$;

0 to 5 mol % $CdF_2$; and 0 to 5 mol % $BiF_3$.

8. An optical waveguide device according to claim 1, the optical glass comprising one or more constituents selected from the group consisting of cerium fluoride and tin fluoride.

9. An optical waveguide device formed at least in part of neodymium-doped fluoroaluminate optical glass having a refractive index, at a wavelength of 600 nm, of less than or equal to about 1.444, in which the optical glass has a composition comprising:

35 to 45 mol % $AlF_3$;

5 to 30 mol % $RF_2$, where R is selected from the group consisting of Ca, Mg, Sr and Ba;

5 to 25 mol % MF, where M is selected from the group consisting of Na, Li, K and Rb; and 0.001 to 10 mol % $NdF_3$; and wherein the device is an optical amplifier comprising plural alternate lengths of:

(i) $Yb^{3+}$-doped optical waveguide; and (ii) optical waveguide formed of the optical glass.

10. An optical waveguide device according to claim 9, in which the $Yb^{3+}$-doped waveguide is formed of a fluoride glass.

11. An optical waveguide device according to claim 10, in which the refractive indices of the core glass of the $Yb^{3+}$-doped optical waveguide and the core glass of the optical waveguide are substantially identical.

12. An optical waveguide device according to claim 9, in which the $Yb^{3+}$-doped optical waveguide is formed of a silica glass.

13. An optical waveguide device according to claim 12, in which the optical waveguide and the $Yb^{3+}$-doped waveguide are lengths of optical fiber spliced at a splicing angle which is not perpendicular to the longitudinal fiber axis.

14. An optical waveguide device formed at least in part of neodymium-doped fluoroaluminate optical glass having a refractive index, at a wavelength of 600 nm, of less than or equal to about 1.444, in which the optical glass has a composition comprising:
   35 to 45 mol % $AlF_3$;
   5 to 30 mol % $RF_2$, where R is selected from the group consisting of Ca, Mg, Sr and Ba;
   5 to 25 mol % MF, where M is selected from the group consisting of Na, Li, K and Rb; and
   0.001 to 10 mol % $NdF_3$; and
   wherein the device is an optical amplifier comprising:
      one or more lengths of optical waveguide formed of the optical glass; and
      one or more amplified spontaneous emission (ASE) suppressing optical gratings disposed at respective positions along the amplifier's length, each grating providing increased attenuation at a wavelength of about 1050 nm.

15. An optical waveguide device according to claim 14 in which each grating is a blazed reflection grating.

16. An optical waveguide device according to claim 14, in which each grating is a long period grating in which light at a wavelength of 1050 nm is induced to couple from a light-guiding core mode to one or more modes propagating substantially outside of the light-guiding core.

17. An optical waveguide device formed at least in part of neodymium-doped fluoroaluminate optical glass having a refractive index, at a wavelength of 600 nm, of less than or equal to about 1.444, in which the optical glass has a composition comprising:
   35 to 45 mol % $AlF_3$;
   5 to 30 mol % $RF_2$, where R is selected from the group consisting of Ca, Mg, Sr and Ba;
   5 to 25 mol % MF, where M is selected from the group consisting of Na, Li, K and Rb; and
   0.001 to 10 mol % $NdF_3$; and
   wherein the device is an optical amplifier comprising:
      a waveguide comprising the optical glass; and
      a distributed amplified spontaneous emission (ASE) suppressing optical gratings imposed on the waveguide, the grating providing increased attenuation at a wavelength of about 1050 nm.

18. An optical waveguide device according to claim 9, the optical amplifier being part of a laser comprising reflector means to promote lasing within the optical amplifier.

19. An optical waveguide device according to claim 1, being an optical fiber waveguide device.

20. An optical waveguide device according to claim 5, the optical glass comprising between 1 mol % and 10 mol % $PO_3$.

21. An optical waveguide device according to claim 5, the optical glass comprising one or more constituents selected from the group consisting of:
   0 to 5 mol % $PbF_2$;
   0 to 5 mol % $CdF_2$; and
   0 to 5 mol % $BiF_3$.

22. An optical waveguide device according to claim 5, the optical glass comprising one or more further constituents selected from the group consisting of cerium fluoride and tin fluoride.

23. An optical waveguide device formed at least in part of neodymium-doped fluoroaluminate optical glass having a refractive index, at a wavelength of 600 nm, of less than or equal to about 1.444, in which the optical glass has a composition comprising:
   35 to 42 mol % $AlF_3$;
   0 to 10 mol % $MgF_2$;
   0 to 30 mol % $CaF_2$;
   0 to 10 mol % $SrF_2$;
   0 to 10 mol % $BaF_2$;
   having a total $MgF_2+CaF_2+SrF_2+BaF_2$ content of 20 to 60 mol %;
   0 to 30 mol % LiF;
   0 to 30 mol % NaF;
   having a total LiF+NaF content of 10 to 40 mol %; and
   0.001 to 10 mol % $NdF_3$, and
   wherein the device is an optical amplifier comprising plural alternate lengths of:
      (i) $Yb^{3+}$-doped optical waveguide; and
      (ii) optical waveguide formed of the optical glass.

24. An optical waveguide device according to claim 23, in which the $Yb^{3+}$-doped waveguide is formed of a fluoride glass.

25. An optical waveguide device according to claim 24, in which the refractive indices of the core glass of the $Yb^{3+}$-doped optical waveguide and the core glass of the optical waveguide are substantially identical.

26. An optical waveguide device according to claim 23, in which the $Yb^{3+}$-doped optical waveguide is formed of a silica glass.

27. An optical waveguide device according to claim 26, in which the optical waveguide and the $Yb^{3+}$-doped waveguide are lengths of optical fiber spliced at a splicing angle which is not perpendicular to the longitudinal fiber axis.

28. An optical waveguide device formed at least in part of neodymium-doped fluoroaluminate optical glass having a refractive index, at a wavelength of 600 nm, of less than or equal to about 1.444, in which the optical glass has a composition comprising:
   35 to 42 mol % $AlF_3$;
   0 to 10 mol % $MgF_2$;
   0 to 30 mol % $CaF_2$;
   0 to 10 mol % $SrF_2$;
   0 to 10 mol % $BaF_2$;
   having a total $MgF_2+CaF_2+SrF_2+BaF_2$ content of 20 to 60 mol %;
   0 to 30 mol % LiF;
   0 to 30 mol % NaF;
   having a total LiF+NaF content of 10 to 40 mol %; and
   0.001 to 10 mol % $NdF_3$, and
   wherein the device is an optical amplifier comprising:
      one or more lengths of optical waveguide formed of the optical glass; and
      one or more amplified spontaneous emission (ASE) suppressing optical gratings disposed at respective positions along the amplifier's length, each grating providing increased attenuation at a wavelength of about 1050 nm.

29. An optical waveguide device according to claim 28, in which each grating is a blazed reflection grating.

30. An optical waveguide device according to claim 28, in which each grating is a long period grating in which light at a wavelength of 1050 nm is induced to couple from a light-guiding core mode to one or more modes propagating substantially outside of the light-guiding core.

31. An optical waveguide device formed at least in part of neodymium-doped fluoroaluminate optical glass having a refractive index, at a wavelength of 600 nm, of less than or equal to about 1.444, in which the optical glass has a composition comprising:

35 to 42 mol % $AlF_3$;

0 to 10 mol % $MgF_2$;

0 to 30 mol % $CaF_2$;

0 to 10 mol % $SrF_2$;

0 to 10 mol % $BaF_2$;

having a total $MgF_2+CaF_2+SrF_2+BaF_2$ content of 20 to 60 mol %;

0 to 30 mol % LiF;

0 to 30 mol % NaF;

having a total LiF+NaF content of 10 to 40 mol %; and 0.001 to 10 mol % $NdF_3$, and wherein the device is an optical amplifier comprising:
 a waveguide comprising the optical glass; and
 a distributed amplified spontaneous emission (ASE) suppressing optical gratings imposed on the waveguide, the grating providing increased attenuation at a wavelength of about 1050 nm.

32. An optical waveguide device according to claim 23, the optical amplifier being part of a laser comprising reflector means to promote lasing within the optical amplifier.

33. An optical waveguide device according to claim 10, wherein the line strength ratio of the 1.3 mm neodynium emission to the 1.3 mm excited state absorption is sufficiently large to provide gain at a wavelength between 1310 and 1317 nm.

34. An optical waveguide device according to claim 10, wherein the line strength ratio of the 1.3 mm neodynium emission to the 1.3 mm excited state absorption is greater than or equal to one of 2.25, 2.5 and 3.0.

* * * * *